United States Patent
Kishibe et al.

(10) Patent No.: US 7,933,373 B2
(45) Date of Patent: Apr. 26, 2011

(54) PHASE CORRECTION CIRCUIT OF ENCODER SIGNAL

(75) Inventors: Taro Kishibe, Hyogo (JP); Takahiro Masuda, Osaka (JP); Hiromi Tanoue, Nara (JP)

(73) Assignee: Panasonic Corporation, Osaka (JP)

( * ) Notice: Subject to any disclaimer, the term of this patent is extended or adjusted under 35 U.S.C. 154(b) by 209 days.

(21) Appl. No.: 11/814,602

(22) PCT Filed: Mar. 28, 2007

(86) PCT No.: PCT/JP2007/056668
§ 371 (c)(1),
(2), (4) Date: Jul. 24, 2007

(87) PCT Pub. No.: WO2007/148461
PCT Pub. Date: Dec. 27, 2007

(65) Prior Publication Data
US 2010/0091926 A1    Apr. 15, 2010

(30) Foreign Application Priority Data
Jun. 19, 2006  (JP) .................. 2006-168327

(51) Int. Cl.
*H04L 7/00* (2006.01)

(52) U.S. Cl. ...................................... 375/371

(58) Field of Classification Search .................. 375/220, 375/265, 340, 355, 371
See application file for complete search history.

(56) References Cited

U.S. PATENT DOCUMENTS

| | | | |
|---|---|---|---|
| 6,232,595 B1 * | 5/2001 | Okamuro et al. | 250/231.16 |
| 6,456,677 B1 * | 9/2002 | Hiramatsu et al. | 375/354 |

FOREIGN PATENT DOCUMENTS

| | | |
|---|---|---|
| JP | 09-042995 A | 2/1997 |
| JP | 2001-296142 | 10/2001 |
| JP | 2003-057073 A | 2/2003 |
| WO | WO 98/21553 | 5/1998 |

OTHER PUBLICATIONS

Japanese Search Report for Application No. PCT/JP2007/056668, dated May 15, 2007.
English translation of Form PCT/ISA/210.

* cited by examiner

*Primary Examiner* — David C. Payne
*Assistant Examiner* — Leon-Viet Q Nguyen
(74) *Attorney, Agent, or Firm* — RatnerPrestia (57) ABSTRACT

A position detector has a peak detector for detecting peak values of an A1 signal and a B1 signal serving as output signals of an analog to digital (AD) converter, an offset/amplitude correction section for generating an A2 signal and a B2 signal by correcting offsets and amplitude errors using the peak values detected by the peak detector, and a position data conversion section for converting the sinusoidal signals of an A phase and a B phase into position data.

13 Claims, 9 Drawing Sheets

PHASE CORRECTION CIRCUIT OF ENCODER SIGNAL

This application is a U.S. National Phase Application of PCT International Application PCT/JP2007/056668.

TECHNICAL FIELD

The present invention relates to a method for correcting phase errors of sinusoidal signals of two phases in an encoder for obtaining high resolution by performing an interpolation process for sinusoidal signals of two phases (or an A phase and a B phase) having a phase difference of 90 degrees.

BACKGROUND ART

In general, position detection of a rotary type (or linear type) encoder is formed by a light emitting device, a light receiving device, and a rotary body (or moving body) formed with slits of a grid pattern therebetween and resolution is determined by a slit interval of the grid pattern. Accordingly, the reduction of the slit interval is performed in order to increase the resolution. However, this method has a limitation in increasing the resolution in terms of processing accuracy or optical diffraction effect.

Recently, a method is widely used which increases the resolution by generating analog signals of sinusoidal waves of A and B phases having a phase difference of 90 degrees synchronized with a signal between the slits of the rotary body (or moving body) and combining a signal obtained by interpolating the analog signals with a signal obtained by the slits. A method for correcting phase errors of sinusoidal signals of two phases is being proposed since position detection accuracy is deteriorated when an error occurs in a phase difference between the sinusoidal signals of the A phase and the B phase due to an error in assembly of the light emitting device or the light receiving device and the rotary body, secular variation or temperature variation.

For example, one method is that the phase difference between the A phase and the B phase is set to 90 degrees by computing a sum and difference of the signals after eliminating offsets of the A phase and the B phase (for example, see Patent Document 1).

Furthermore, another method is that a phase error from an intersection point of the A phase and the B phase is obtained, a correction factor from the obtained phase error is calculated, and the phases are corrected using a phase error cancellation/conversion equation for the B phase (for example, see Patent Document 2).

However, the method of Patent Document 1 has a problem in that the amplitudes of the A phase and the B phase after phase correction vary relative to each other. Moreover, the method of Patent Document 1 has a problem in that offsets are to be corrected by computing a maximum value and a minimum value of the A phase and the B phase of the original signals, amplitudes are to be adjusted by obtaining a maximum value and a minimum value of the signals after phase correction, so that it is time-consuming in arithmetic processing.

On the other hand, the method of Patent Document 2 computes a phase error δ and corrects a phase error of the original signal (for example, the B phase) according to sin δ and cos δ. However, there is a problem in that a phase error is accurately not corrected when the phase error is large since an approximate treatment is performed to compute sin δ and amplitude fluctuation affects position detection accuracy since the amplitude fluctuation also occurs.

When arithmetic processing is performed using tables, there is a problem in that two tables for sin and cos computations are required.

In addition, there is a problem in that a shift occurs in phases of an interpolation signal and a signal between slits since the B phase is corrected with reference to one phase (for example, the A phase) and a combination defect occurs when a phase error is large.

[Patent Document 1] Japanese Patent Unexamined Publication No. 2001-296142

[Patent Document 2] Japanese Patent Unexamined Publication No. 9-42995

DISCLOSURE OF THE INVENTION

The present invention has been designed to address at least the above problems. An object of the present invention is to provide a phase correction circuit of an encoder signal.

A position detector including a phase correction circuit of an encoder signal in accordance with the present invention has an analog to digital (AD) converter for generating an A1 signal and a B1 signal by converting sinusoidal signals of an A phase and a B phase having a phase difference of 90 degrees into digital data, a peak detector for detecting peak values of the A1 signal and the B1 signal. The position detector further includes an offset/amplitude correction section for generating an A2 signal and a B2 signal by correcting offsets and amplitude errors using the peak values detected by the peak detector, and a position data conversion section for converting the sinusoidal signals of the A phase and the B phase into position data. In the position detector, the phase correction circuit of an encoder signal in accordance with the present invention includes a phase error detector for detecting an intersection value of the A2 signal and the B2 signal and a phase correction section for computing a correction factor of the A2 signal and the B2 signal from the intersection value detected by the phase error detector. The phase correction section generates an A correction signal and a B correction signal by multiplying the A2 signal and the B2 signal by the correction factor and corrects phase errors of the A phase and the B phase by adding the B correction signal to the A2 signal and adding the A correction signal to the B2 signal.

In accordance with the present invention, the phase error detector may correct phase errors by detecting a value of the B2 signal at a point at which a peak value of the A1 signal is detected and detecting a value of the A2 signal at a point at which a peak value of the B1 signal is detected.

DESCRIPTION OF REFERENCE NUMERALS AND SIGNS

2: AD CONVERTER
4: OFFSET/AMPLITUDE CORRECTION SECTION
6: PHASE CORRECTION SECTION
7: PHASE ERROR DETECTOR
8: AMPLITUDE CORRECTION SECTION
9: PHASE CORRECTION CIRCUIT
10: POSITION DATA CONVERSION SECTION
13: PHASE ERROR CORRECTION AMOUNT
14, 14d: INTERPOLATION ANGLE DATA θIP
15: PEAK DETECTOR
16: MAXIMUM/MINIMUM VALUE SIGNAL
17a, 17b: LOGIC SIGNAL OF A/B PHASE
18: MAXIMUM/MINIMUM VALUE DETECTION TRIGGER SIGNAL
A0, B0: ORIGINAL ANALOG SIGNAL OF A/B PHASE
A1, B1: A/B PHASE SIGNAL AFTER DIGITAL CONVERSION
A2, B2: A/B PHASE SIGNAL AFTER OFFSET/AMPLITUDE CORRECTION
A3, B3: A/B PHASE SIGNAL AFTER PHASE CORRECTION
A4, B4: A/B PHASE SIGNAL AFTER AMPLITUDE CORRECTION

PREFERRED EMBODIMENTS FOR CARRYING OUT THE INVENTION

Hereinafter, preferred embodiments of the present invention are described with reference to the accompanying drawings.

First Embodiment

Figure 1:
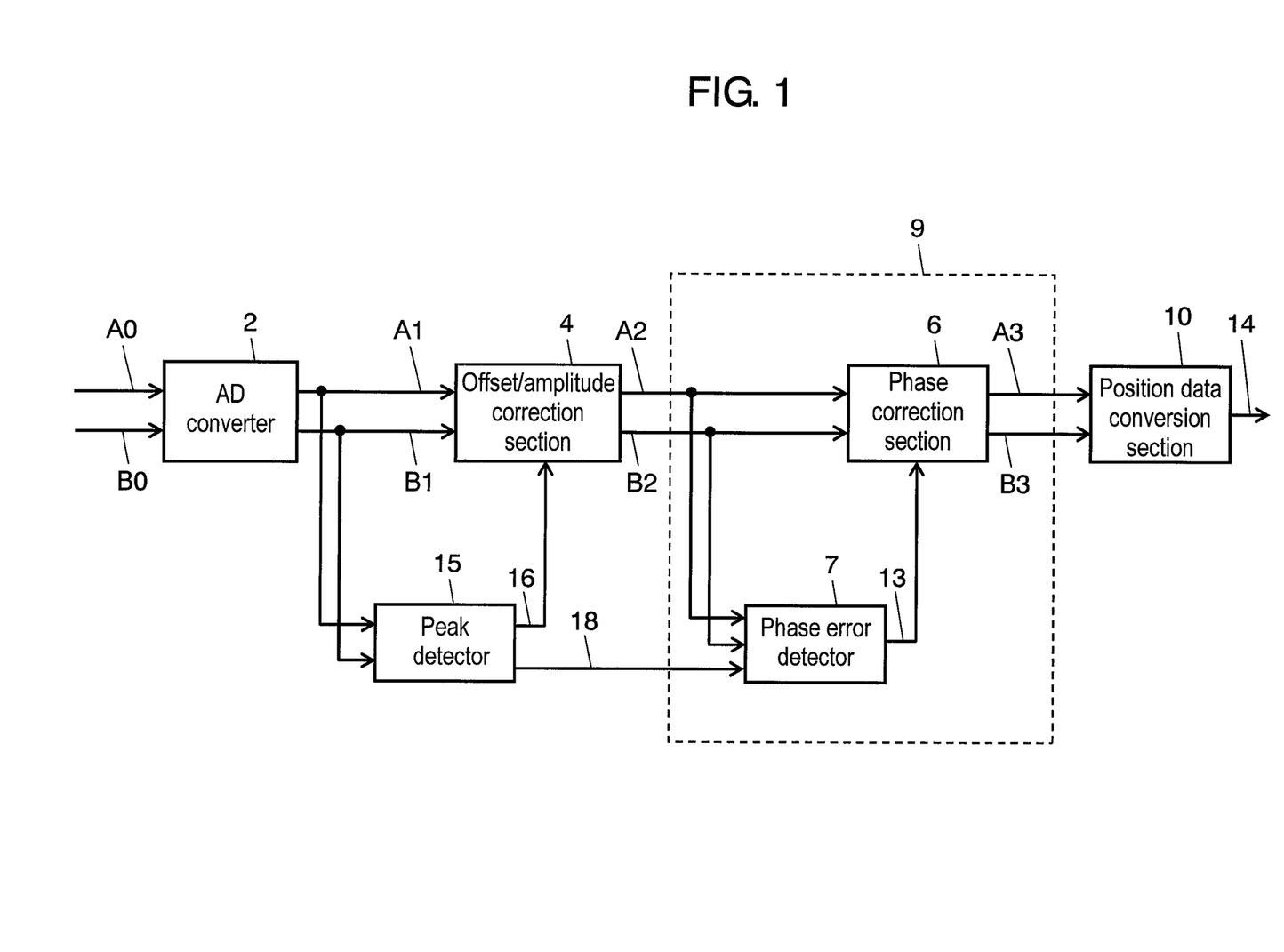
FIG. 1 is a block diagram illustrating an encoder circuit in accordance with a first embodiment of the present invention.

A phase correction circuit of an encoder signal in accordance with the present invention is described with reference to FIGS. 1 to 6. FIG. 1 is a block diagram illustrating an encoder signal processing circuit and FIGS. 2 to 6 illustrate operation waveforms of phase error detection.

In FIG. 1, an analog A0 signal and an analog B0 signal in the original signals output from an encoder are sinusoidal signals of an A phase and a B phase having a phase difference of 90 degrees. In general, the encoder is constructed with a light emitting device, a light receiving device, and a slit plate.

The light emitting device uses a light emitting diode (LED) or laser beam and the light receiving device uses a photo diode or photo transistor. The slit plate is made of a resin material or a glass for transmitting light. A grid pattern mask for blocking light is provided on the slit plate. Arrangement is made such that the light receiving device receives the transmitted light from the light emitting device via the slit plate. Since the slit plate is installed to a rotary body of the encoder, a grid pattern of the slit plate is formed such that a sinusoidal waveform is output from the light receiving device when rotation is made.

Analog to digital (AD) converter 2 converts the A0 signal and the B0 signal serving as the analog signals output from the encoder into digital signals. If the signals are amplified several times with an amplifier and the like since the amplitudes of the analog signals output from the encoder are several 100 mV and the amplified signals are converted into voltages adjusted in an input range of AD converter 2, the accuracy of the analog signals can be increased.

Peak detector 15 detects peak values of an A1 signal and a B1 signal serving as output signals of AD converter 2. A method for detecting the peak values compares a value of previous sampling of the A1 signal with a value of current sampling of the A1 signal, and keeps the value of current sampling if the value of current sampling is larger than that of previous sampling. A maximum value can be detected by performing the above-described operation in an interval of from 0 to 180 degrees of the sinusoidal wave of the A1 signal.

Similarly, in terms of a minimum value, a value of previous sampling is compared with a value of current sampling and the value of current sampling is kept if the value of current sampling is smaller than that of previous sampling. The minimum value can be detected by performing the above-described operation in an interval of from 180 to 360 degrees of the sinusoidal wave of the A1 signal. Also in terms of the B1 signal shifted by 90 degrees, a maximum value and a minimum value can be detected by performing the same process while shifting a detection operation interval by 90 degrees.

Offset/amplitude correction section 4 eliminates offsets of the A1 signal and the B1 signal using maximum/minimum value signals 16 detected by peak detector 15 and normalizes the amplitudes of the A1 signal and the B1 signal.

Offsets OS_DETa and OS_DETb of the A1 signal and the B1 signal can be obtained from Equation (1) using maximum/minimum value signals 16. When an offset value for correction is denoted by OS_LEVEL and signals after offset elimination are an A1$d$ signal and a B1$d$ signal, the offsets can be eliminated by Equation (2).

$$OS\_DETa = (\text{Maximum Value of } A1 \text{ Signal} + \text{Minimum Value of } A1 \text{ Signal})/2$$

$$OS\_DETb = (\text{Maximum Value of } B1 \text{ Signal} + \text{Minimum Value of } B1 \text{ Signal})/2 \quad (1)$$

$$A1d = A1 - OS\_DETa + OS\_LEVEL$$

$$B1d = B1 - OS\_DETb + OS\_LEVEL \quad (2)$$

Amplitude values PP_DETa and PP_DETb of the A1 signal and the B1 signal can be computed by Equation (3) using maximum/minimum value signals 16. When the magnitude for amplitude normalization is set to K, an A2 signal and a B2 signal in which the offsets and the amplitude errors have been corrected can be obtained from Equation (4).

$$PP\_DETa = (\text{Maximum Value of } A1 \text{ Signal} - \text{Minimum Value of } A1 \text{ Signal})$$

$$PP\_DETb = (\text{Maximum Value of } B1 \text{ Signal} - \text{Minimum Value of } B1 \text{ Signal}) \quad (3)$$

$$A2 = A1d \times K / PP\_DETa$$

$$B2 = B1d \times K / PP\_DETb \quad (4)$$

Next, an operation of phase correction circuit 9 in accordance with the present invention is described. Phase correction circuit 9 is constructed with phase correction section 6 and phase error detector 7. Phase error detector 7 detects phase errors of the A2 signal and the B2 signal in which the off sets/amplitudes have been corrected. On the basis of error amounts detected by phase error detector 7, phase correction section 6 performs a function for outputting an A3 signal and a B3 signal having a phase difference of 90 degrees using an A correction signal and a B correction signal for correcting the phase errors of the A2 signal and the B2 signal.

Figure 2:
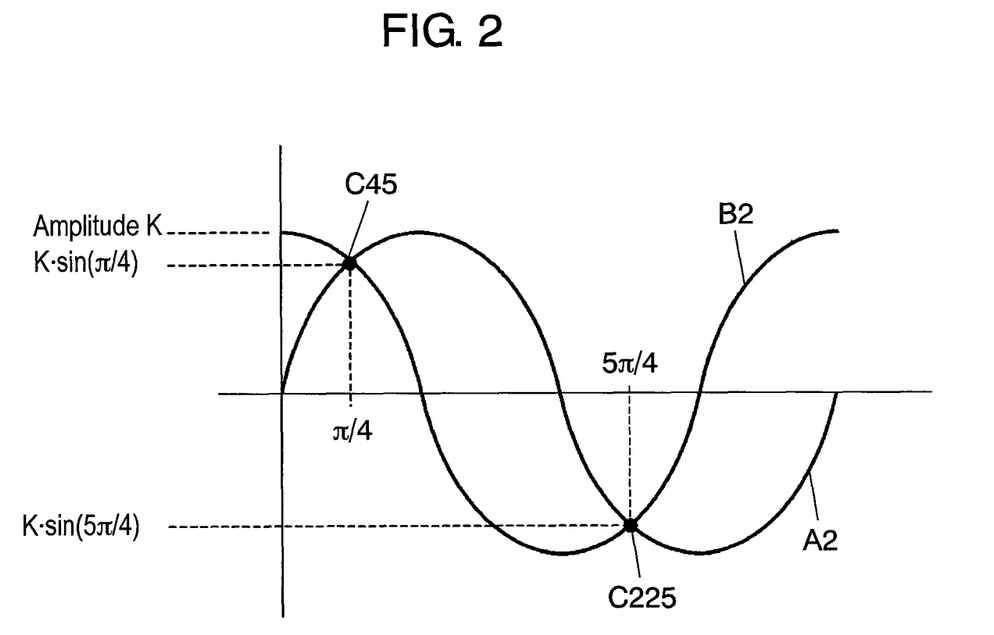
FIG. 2 is an explanatory view illustrating a signal waveform in accordance with the first embodiment of the present invention.

This operation is described in detail with reference to FIGS. 2 to 4. FIG. 2 illustrates the A2 signal and the B2 signal without phase errors. Since offset/amplitude correction means 4 normalizes the amplitudes to the magnitude K, the amplitudes of the A2 signal and the B2 signal are set to K.

Phase error detector 7 detects the magnitudes of amplitudes at intersection points of the A2 signal and the B2 signal and computes and derives phase correction amounts from intersection values. FIG. 2 illustrates an example in the case where no phase error is present. In this case, the intersection points of the A2 signal and the B2 signal are at $\pi/4$ radian and $5\pi/4$ radian, and the magnitudes of the amplitudes at the intersection points become $K \sin(\pi/4)$ and $K \sin(5\pi/4)$. In this case, the phase correction amounts become 0.

Figure 3:
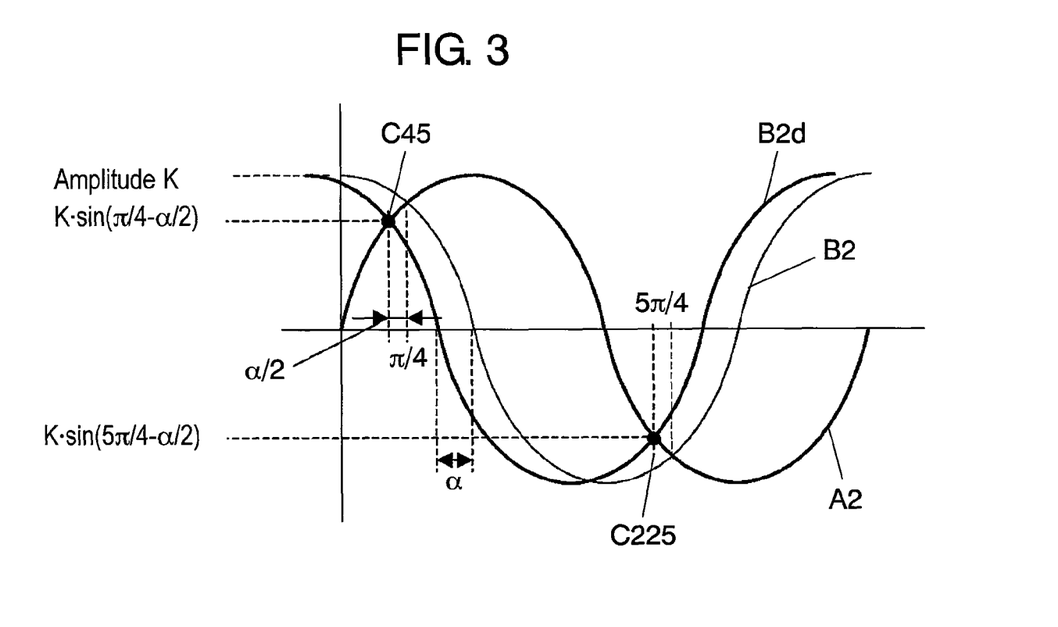
FIG. 3 is an explanatory view illustrating a signal waveform in accordance with the first embodiment of the present invention.
Figure 4:
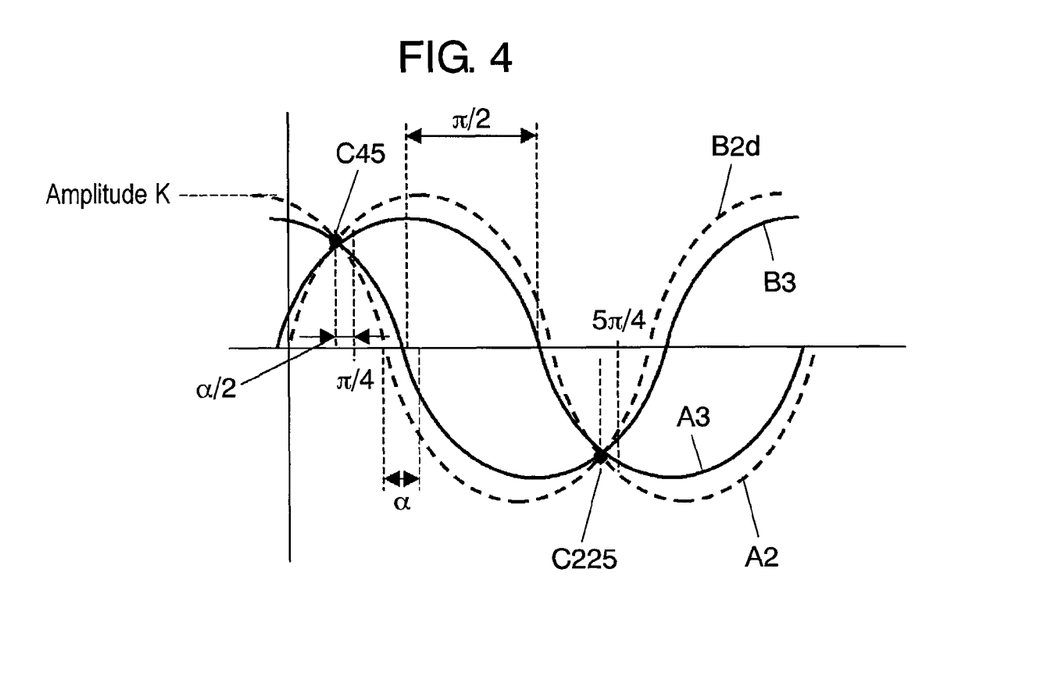
FIG. 4 is an explanatory view illustrating a signal waveform in accordance with the first embodiment of the present invention.

FIG. 3 illustrates an example of a B2$d$ signal in which only the phase of the B2 signal is advanced by $\alpha$ radian with respect to the A2 signal. The A2 signal and the B2$d$ signal can be defined as shown in Equation (5). In this case, intersection points of the A2 signal and the B2$d$ signal are at $(\pi/4-\alpha/2)$ radian and $(5\pi/4-\alpha/2)$ radian, and the magnitudes of amplitudes at the intersection points become $K \sin(\pi/4-\alpha/2)$ and $K \sin(5\pi/4-\alpha/2)$.

Since the magnitudes are the same as each other, the phase errors $\alpha/2$ can be computed by Equation (6) when $C45=K \sin(\pi/4-\alpha/2)$ and $C225=K \sin(5\pi/4-\alpha/2)$. It is obvious that an arithmetic operation is performed by an arc sin equation since the B correction signal is computed on the basis of the A2 signal in Equation (6), but the correction signal can be computed by an arc cos equation on the basis of the B2$d$ signal.

$$A2 = K \sin\theta$$

$$B2d = K \cos(\theta+\alpha) \qquad (5)$$

$$\alpha/2 = \pi/4 - \sin^{-1}(C45/K)$$

$$\alpha/2 = \pi/4 - \sin^{-1}(C225/K) \qquad (6)$$

Phase correction section 6 can correct the phase errors on the basis of Equation (7) and Equation (8). Herein, Kp1 and Kp2 are phase correction gains for obtaining the A correction signal and the B correction signal, and the phase correction gains are set such that a phase difference between an A3 signal and a B3 signal is 90 degrees.

$$A3 = A2 + Kp1 \cdot B2d = K \sin\theta + Kp1 \cdot K \cos(\theta+\alpha) \qquad (7)$$

$$B3 = B2d + Kp2 \cdot A2 = K \cos(\theta+\alpha) + Kp2 \cdot K \sin\theta \qquad (8)$$

Next, a method for obtaining Kp1 and Kp2 is described.

Kp1 can be obtained from Equation (9) since the A3 signal can be set to 0 when $\theta=-\alpha/2$ in Equation (7).

$$0 = K \sin(-\alpha/2) + Kp1 \cdot K \cos(\alpha/2)$$

$$Kp1 = \tan(\alpha/2) \qquad (9)$$

Similarly, Kp2 can be obtained from Equation (10) since the B3 signal can be set to 0 when $\theta=\pi/2-\alpha/2$ in Equation (8).

$$0 = K \cos(\pi/2+\alpha/2) + Kp2 \cdot K \sin(\pi/2-\alpha/2)$$

$$Kp2 = \tan(\alpha/2) \qquad (10)$$

Since Kp1 and Kp2 obtained by Equation (9) and Equation (10) can be expressed in the same equation, Kp=Kp1=Kp2 and therefore the load of arithmetic processing is half reduced. In Equation (6), $\alpha/2$ is computed for the A2 signal and the B2 signal (B2$d$ signal). The phase correction gain is computed in Equation (9) or Equation (10), and the A3 signal and the B3 signal in which a phase shift has been corrected can be obtained using Equation (7) and Equation (8).

The magnitudes of the A3 signal and the B3 signal whose phases have been corrected are described. Since the maximum values of the amplitudes of Equation (7) and Equation (8) are at points of $\theta=\pi/2-\alpha/2$ and $\theta=-\alpha/2$, the A3 signal and the B3 signal are defined by Equation (11) and Equation (12) when these values are substituted into Equation (7) and Equation (8). The correction can be performed in the same magnitude as illustrated in FIG. 4. Since two intersection points are present in one cycle of the signals of the two phases, Kp computed at the intersection points can be averaged and used.

$$A3 = K\sin(\pi/2-\alpha/2) + Kp \cdot K\cos(\pi/2+\alpha/2) \qquad (11)$$
$$= K\cos(\alpha/2) - Kp \cdot K\sin(\alpha/2)$$

$$B3 = K\cos(\alpha/2) + Kp \cdot K\sin(-\alpha/2) \qquad (12)$$
$$= K\cos(\alpha/2) - Kp \cdot K\sin(\alpha/2)$$

Next, position data conversion means 10 is described. If the A3 signal and the B3 signal having the phase difference of 90 degrees are used in Equation (13), the conversion into angle data $\theta IP$ (14) can be easily performed.

$$\theta IP = \tan^{-1}(A3/B3) \qquad (13)$$

Since a relative ratio of amplitudes is identical irrespective of phase correction amounts of the signal A3 and the signal B3, position data can be computed without performing amplitude correction.

Figure 5:
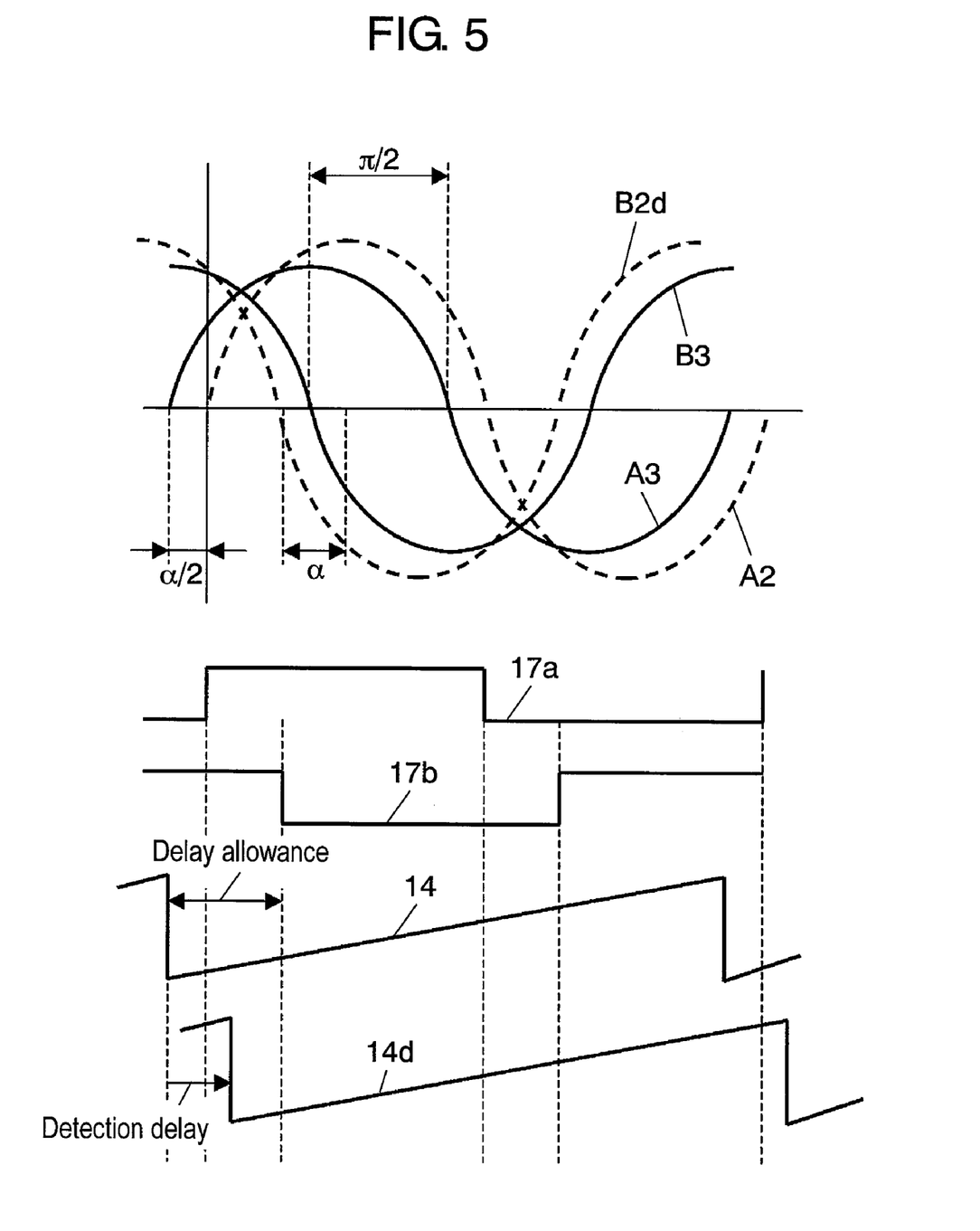
FIG. 5 is an explanatory view illustrating a signal waveform in accordance with the first embodiment of the present invention.
Figure 6:
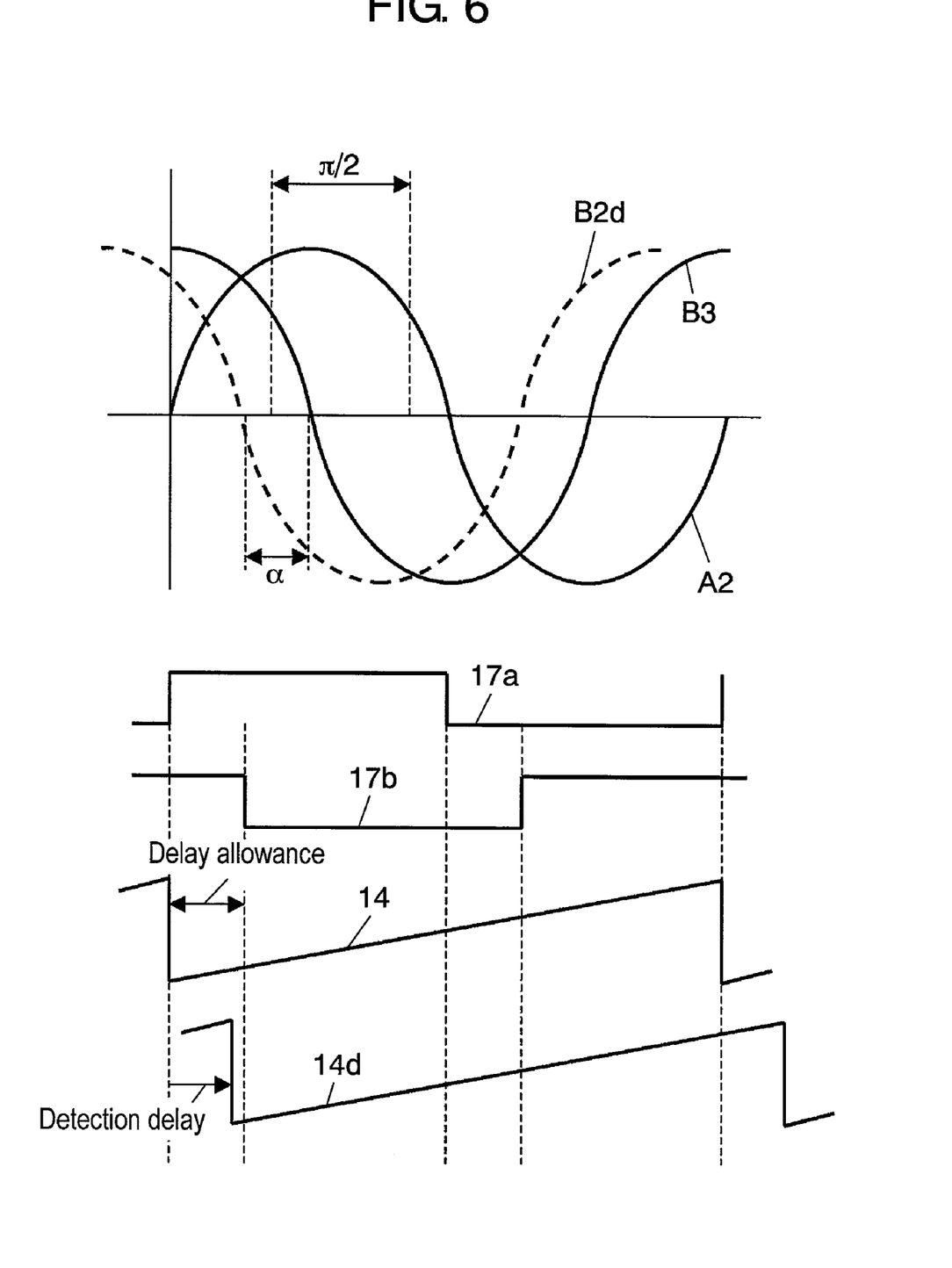
FIG. 6 is an explanatory view illustrating a signal waveform in accordance with the first embodiment of the present invention.

Herein, the effectiveness of a method for performing phase correction in two phases is described with reference to FIGS. 5 and 6. FIG. 5 illustrates an operation waveform in accordance with the present invention, and FIG. 6 illustrates an operation waveform in which one phase is fixed and only one phase is corrected.

In FIG. 5, the A2 signal and the B2$d$ signal are two phase signals before phase correction and the A3 signal and the B3 signal are two phase signals after phase correction. In FIG. 6, the A2 signal and the B2$d$ signal are two phase signals before phase correction and the B3 signal is that obtained by correcting the phase of the B2$d$ signal on the basis of the phase of the A2 signal. Logic signal 17$a$ and logic signal 17$b$ represent upper digital data in positive/negative square wave outputs based on 0 of the A2 signal and the B2$d$ signal. Positions can be detected by counting the number of pulses in logic signal 17$a$ and logic signal 17$b$. Interpolation angle data $\theta IP$ (14) is obtained from the A3 signal and the B3 signal of the two phases. The resolution of one rotation is defined by combining interpolation angle data $\theta IP$ (14) with the upper digital data.

Since it is difficult to set phase errors of interpolation angle data $\theta IP$ (14) and the upper digital data to 0, the phase is shifted. For example, the upper data is counted at rising edges of logic signal 17$b$ and a shift part is corrected when the upper data is combined with interpolation angle data $\theta IP$ (14). The shift part can be easily corrected by adding a upper count value to +1 or -1 in an allowable delay interval of FIG. 5 or FIG. 6.

Since interpolation angle data $\theta IP$ (14) has a detection delay of the AD converter and an arithmetic delay of the interpolation process, interpolation angle data θIP (14) is actually indicated by 14d. If only one phase is corrected as illustrated in FIG. 6, no delay allowance margin is present. If the phase errors of the A2 signal and the B2d signal are large, the upper digital data cannot be combined with the interpolation data.

Since the delay allowance margin can be made by correcting both phases as illustrated in FIG. 5, phase correction circuit 9 of the present invention can correct the phases even when the phase errors are large.

A structure after the offset correction process and the amplitude correction process for the A0 signal and the B0 signal serving as the original analog signals has been described above. Alternatively, if a circuit structure performs the offset correction process and the amplitude correction process for the A0 signal and the B0 signal in an analog circuit, a circuit structure can be constructed to perform the phase correction process by inputting the A1 signal and the B1 signal detected by AD converter 2 to the phase correction circuit of the present invention.

In the circuit structure and the arithmetic process in accordance with the first embodiment as described above, a high resolution encoder robust to secular variation or temperature variation, fabrication variation and noise can be obtained.

Since the phase correction process is performed for phase errors of sinusoidal signals of two phases having a phase difference of 90 degrees such that an amplitude ratio in the two phases are identical, positions can be computed from the signals of the two phases after the phase correction process.

Since the phase errors of the sinusoidal signals of the two phases having the phase difference of 90 degrees are corrected, respectively, phase errors of an interpolation signal and a signal between slits can be reduced and large phase errors can be also processed. In addition, since the same phase correction factor can be used for the sinusoidal signals of the two phases, an arithmetic process for computing the phase correction factor can be simplified.

Second Embodiment

The second embodiment of the present invention is described with reference to FIGS. 7 and 8. The second embodiment is different from the first embodiment in that an inverted signal of one side of two phase signals is used for error detection of phase error detector 7 and this difference is described below.

Figure 7:
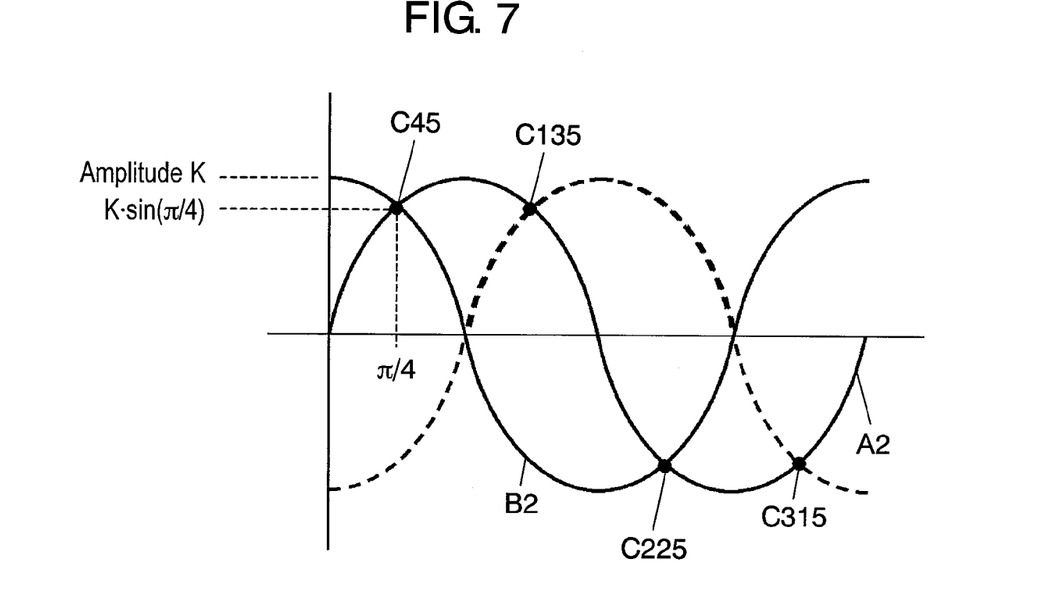
FIG. 7 is an explanatory view illustrating a signal waveform in accordance with a second embodiment of the present invention.

Like FIG. 2, FIG. 7 illustrates waveforms of the A2 signal and the B2 signal for which an offset correction process and an amplitude correction process have been performed. FIG. 7 is different from FIG. 2 in that an inverted signal of the B2 signal is generated and intersection points C135 and C315 are present between the inverted signal and the A2 signal.

Figure 8:
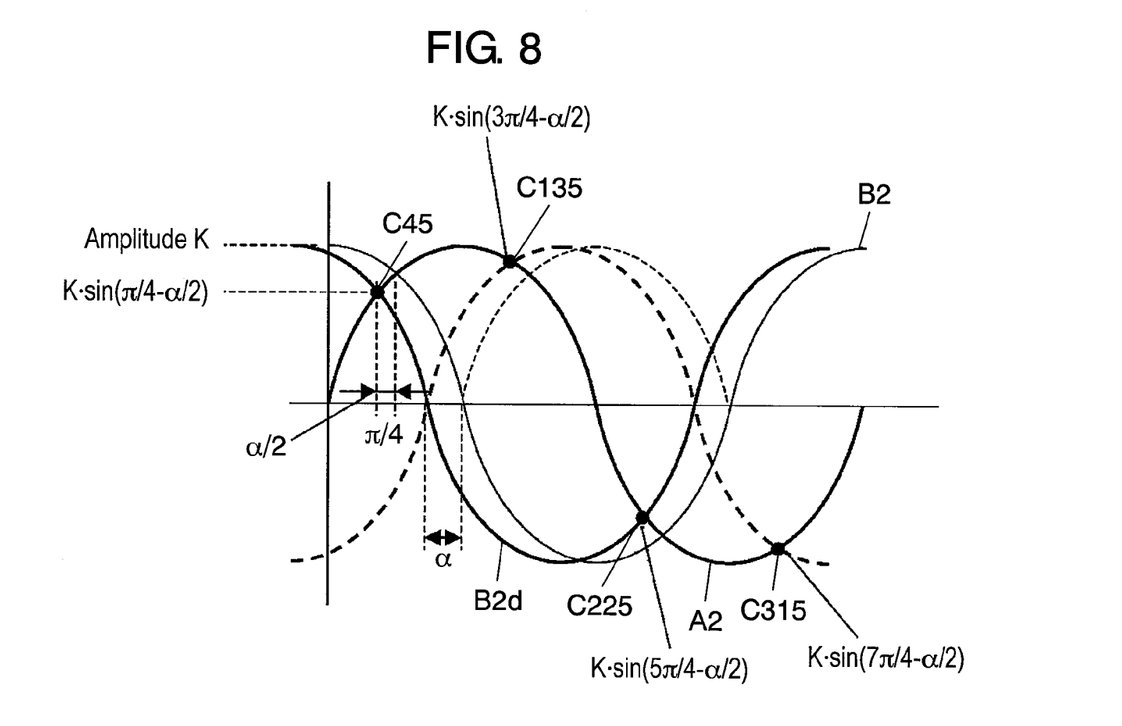
FIG. 8 is an explanatory view illustrating a signal waveform in accordance with the second embodiment of the present invention.

FIG. 8 illustrates the B2d signal in which the phase of the B2 signal between the A2 and B2 signals is advanced by α radian. Since intersection points C45 and C225 can be detected in the structure equal to that of the first embodiment, a method for detecting intersection points C135 and C315 is described.

The intersection points of the A2 signal and the inverted signal of the B2d signal are at $(3\pi/4-\alpha/2)$ radian and $(7\pi/4-\alpha/2)$ radian, and the magnitudes at the intersection points become $K\sin(3\pi/4-\alpha/2)$ and $K\sin(\pi/4-\alpha/2)$. When $C135=K\sin(3\pi/4-\alpha/2)$ and $C315=K\sin(7\pi/4-\alpha/2)$ since the magnitudes are the same as each other, the phase errors α/2 can be computed by Equation (14) and Kp can be computed.

$$\alpha/2 = 3\pi/4 - \sin^{-1}(C135/K)$$

$$\alpha/2 = 3\pi/4 - \sin^{-1}(C315/K) \quad (14)$$

Since four intersection points are present in one cycle of the signals of the two phases, Kp computed at the intersection points can be averaged and used.

Since the phase errors of the sinusoidal signals of the two phases having the phase difference of 90 degrees are corrected in the signal detection process and the arithmetic process in accordance with the second embodiment as described above, a high resolution encoder robust to secular variation or temperature variation, fabrication variation and noise can be obtained.

Third Embodiment

The third embodiment of the present invention is described with reference to FIG. 9. The third embodiment is different from the first and second embodiments in that peak values of two phase signals are used at error detection points of phase error detector 7 and this difference is described below.

Figure 9:
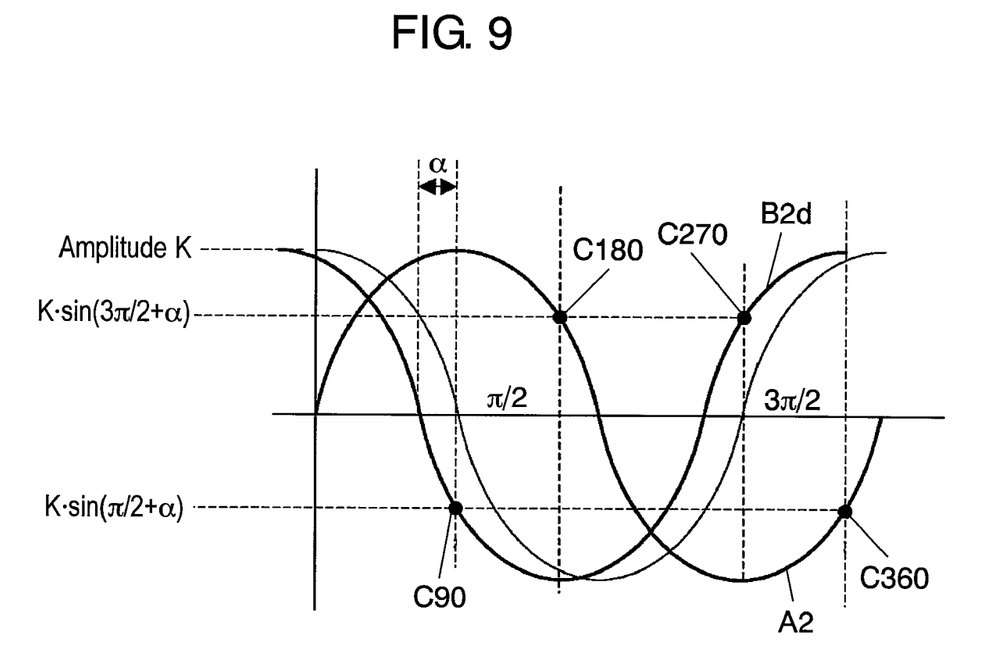
FIG. 9 is an explanatory view illustrating a signal waveform in accordance with a third embodiment of the present invention.

Like FIG. 3, FIG. 9 illustrates waveforms of the A2 signal and the B2d signal for which an offset correction process and an amplitude correction process have been performed. The B2d signal is the case where the ideal B2 signal is shifted by a phase of α radian.

Phase error detection points are those at which peak values of the A2 signal and the B2d signal are detected. These points can be detected by peak detector 15 from the A1 signal and the B1 signal whose peak points are identical. If the A2 signal and the B2d signal are two ideal phase signals having a phase difference of 90 degrees, one signal is 0 at the peak points of the signals. However, when a phase error is present, the signal is not 0 and $C90=K\sin(\pi/2+\alpha)$ in FIG. 9. Then, the phase error α/2 can be computed from Equation (15) and Kp can be computed.

$$\alpha/2 = \sin^{-1}(C90/K)/2 - \pi/4 \quad (15)$$

Similarly, the phase errors α/2 can be also computed at points of C180, C270, and C360. Since four peak points are present in one cycle of the signals of the two phases, Kp computed at the peak points can be averaged and used.

Since the phase errors of the sinusoidal signals of the two phases having the phase difference of 90 degrees can be corrected in the signal detection process and the arithmetic process in accordance with the third embodiment as described above, a high resolution encoder robust to secular variation or temperature variation, fabrication variation and noise can be obtained.

Fourth Embodiment

The fourth embodiment of the present invention is described with reference to FIG. 10. The fourth embodiment is different from the first to third embodiments in that the zero cross of two phase signals is used at error detection points of phase error detector 7 and this difference is described below.

Figure 10:
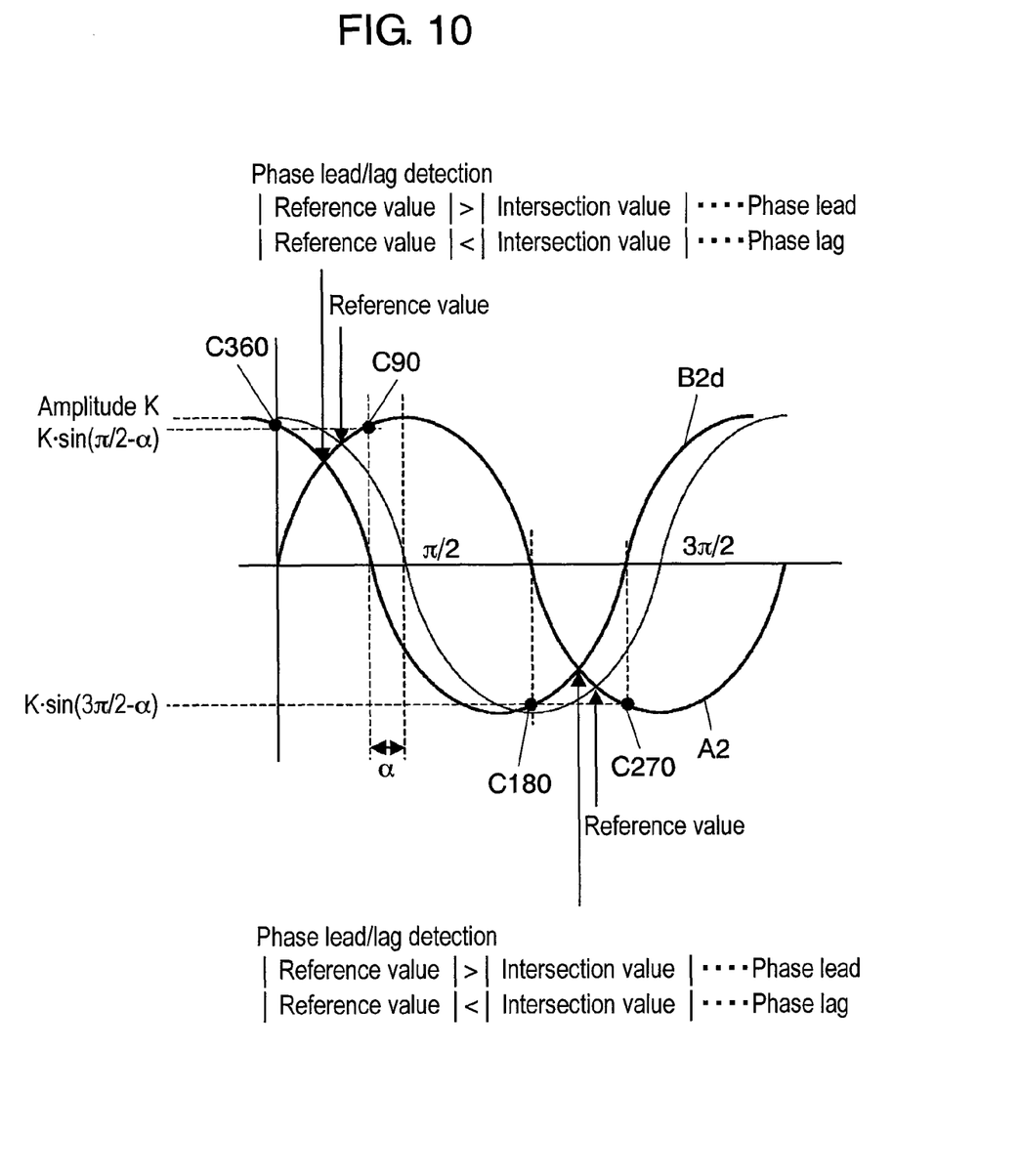
FIG. 10 is an explanatory view illustrating a signal waveform in accordance with a fourth embodiment of the present invention.

Like FIG. 3, FIG. 10 illustrates waveforms of the A2 signal and the B2d signal for which an offset correction process and an amplitude correction process have been performed. The B2d signal is the case where an ideal B2 signal is shifted by a phase of α radian. A phase error detection point is a point (zero cross) at which the A2 signal and the B2d signal are 0.

If the A2 signal and the B2d signal are two ideal phase signals having a phase difference of 90 degrees, one signal at the zero cross point has a value equal to K normalized by offset/amplitude correction means 4. However, when a phase error is present, the signal does not have the value equal to K and $C90=K\sin(\pi/2-\alpha)$ in FIG. 10. Then, the phase error α/2 can be computed from Equation (16).

$$\alpha/2 = \pi/4 - \sin^{-1}(C90/K)/2 \quad (16)$$

Since the B2d signal has a symmetric property at the point of C90, the B2d signal has the same magnitude even when the phase error is α or −α. The phase lead/lag can be detected through a quantitative comparison between a reference value and an intersection value of the A2 signal and the B2$d$ signal when an intersection point of the A2 signal and the B2$d$ signal without phase error is set to the reference value. When Intersection Value>Reference Value, the phase lag is present. When Intersection Value<Reference Value, the phase lead is present.

The phase lead/lag can be also detected from a value of the B2$d$ signal at the peak point of the A2 signal and a value of the A2 signal at the peak point of the B2$d$ signal. For example, the phase lead is present when the B2$d$ signal is negative at a point of a maximum value of the A2 signal and the phase lag is present when the B2$d$ signal is positive at the point. Further, the phase lead is present when the B2$d$ signal is positive at a point of a minimum value of the A2 signal and the phase lag is present when the B2$d$ signal is negative at the point. Similarly, the phase lead/lag can be also detected from the value of the A2 signal at the peak point of the B2$d$ signal.

In this structure, Kp can be computed. Similarly, the phase errors α/2 can be also computed from points of C180, C270, and C360. Since four zero-cross points are present in one cycle of the signals of the two phases, Kp computed at the zero cross points can be averaged and used.

Since the phase errors of the sinusoidal signals of the two phases having the phase difference of 90 degrees can be corrected in the signal detection process and the arithmetic process in accordance with the fourth embodiment as described above, a high resolution encoder robust to secular variation or temperature variation, fabrication variation and noise can be obtained.

Fifth Embodiment

Figure 11:
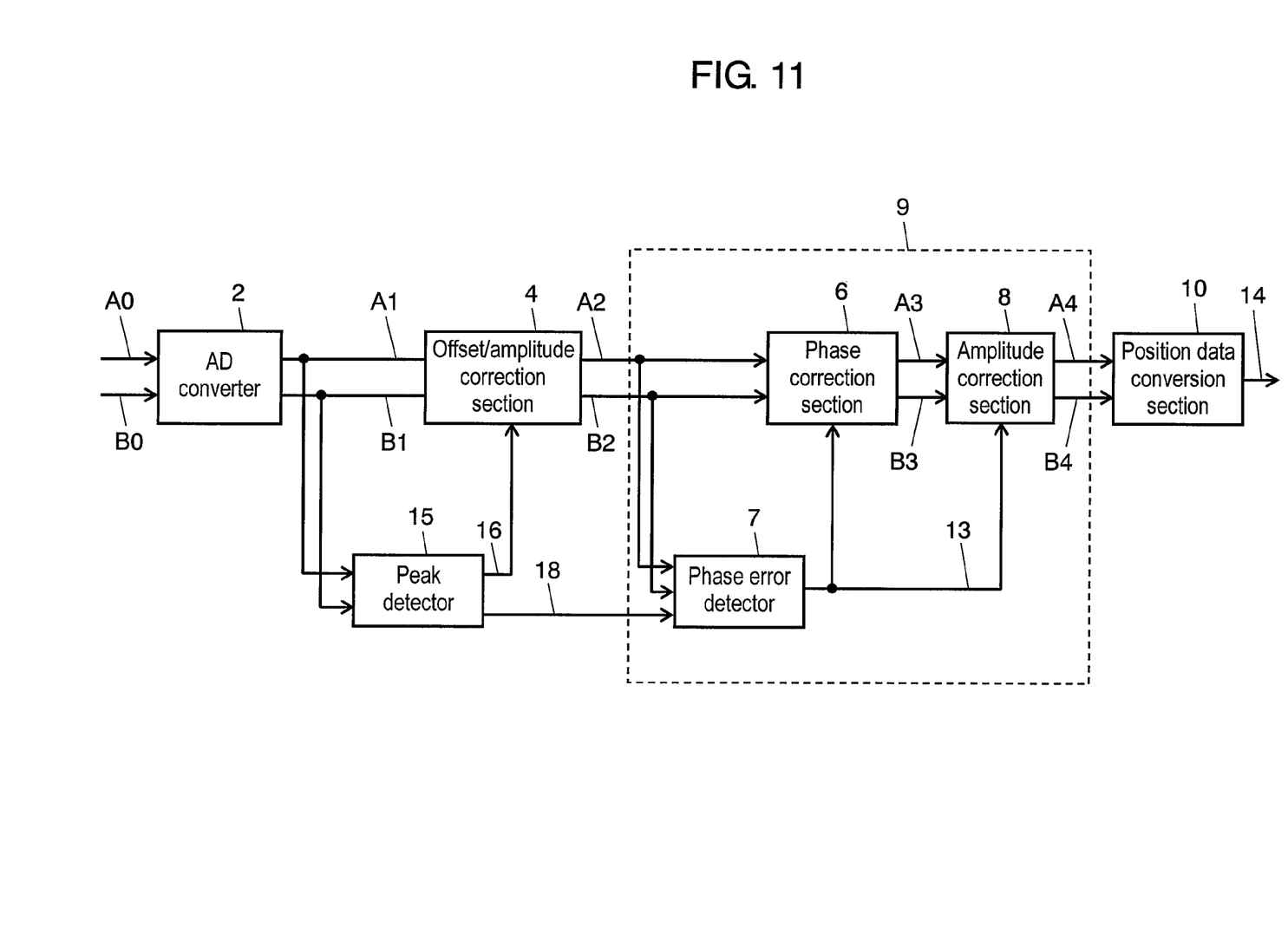
FIG. 11 is a block diagram illustrating an encoder circuit in accordance with a fifth embodiment of the present invention.

The fifth embodiment of the present invention is described with reference to FIG. 11. The fifth embodiment is different from the first to fourth embodiments in that amplitude correction section 8 again corrects amplitudes after phase correction and position data conversion section 10 computes interpolation angle data θIP (14), and this difference is described below.

The A3 signal and the B3 signal after phase correction have amplitude variations with respect to the A2 signal and the B2 signal after amplitude correction. A variation amount varies with the magnitude of a phase error α and is defined by Equation (7) and Equation (8) or Equation (11) and Equation (12). When θ+α/2=π/2 in Equation (7), the A3 signal has the maximum value and can be defined as shown in Equation (17). When an amplitude correction gain Ka for returning the amplitude to the magnitude K after normalization is set, an A4 signal and a B4 signal after amplitude correction can be computed by Equation (18). The amplitude correction gain Ka from Equation (17) and Equation (18) is defined by Equation (19).

$$|A3| = K\sin\theta + Kp \cdot K\cos(\theta + \alpha) \quad (17)$$
$$= K\sin(\pi/2 - \alpha/2) + Kp \cdot K\cos(\pi/2 + \alpha/2)$$
$$= K\cos(\alpha/2) - Kp \cdot K\sin(\alpha/2)$$

$$A4 = Ka \cdot A3 \quad (18)$$
$$B4 = Ka \cdot B3$$

$$|A4| = Ka \cdot |A3| \quad (19)$$
$$= Ka \cdot (K\cos(\alpha/2) - Kp \cdot K\sin(\alpha/2))$$
$$Ka = 1/(\cos(\alpha/2) - Kp\sin(\alpha/2))$$

Since the phase errors of the sinusoidal signals of the two phases having the phase difference of 90 degrees can be corrected according to the fifth embodiment to which an amplitude correction means is added after phase correction as described above, a high resolution encoder robust to secular variation or temperature variation, a fabrication variation and noise can be obtained. In addition, since both A and B phases can use the same phase correction factor as each other, the arithmetic process for computing the phase correction factor is simplified. Since an amplitude correction gain can be computed using a detection value equal to that of the phase correction also in amplitude variation, interpolation data can be easily computed.

Sinusoidal waves serving as two phase signals in the first to fifth embodiments have been described. Alternatively, a phase correction process can be also performed for triangular waves and pseudo sinusoidal waves having a distorted waveform in a similar structure.

INDUSTRIAL APPLICABILITY

A phase correction circuit of an encoder signal in accordance with the present invention is not limited to a servomotor control device, and is useful for a device in which an encoder for acquiring high resolution position information is mounted.

The invention claimed is:
1. A phase correction circuit of an encoder signal in a position detector, the position detector having:
 an analog to digital (AD) converter for generating an A1 signal and a B1 signal by converting sinusoidal signals of an A phase and a B phase having a phase difference of 90 degrees into digital data;
 a peak detector for detecting peak values of the A1 signal and the B1 signal;
 an offset/amplitude correction section for generating an A2 signal and a B2 signal by correcting offsets and an amplitude error using the peak values detected by the peak detector; and
 a position data conversion section for converting the sinusoidal signals of the A phase and the B phase into position data, the phase correction circuit comprising:
 a phase error detector for detecting an intersection value of the A2 signal and the B2 signal; and
 a phase correction section for computing a correction factor of the A2 signal and the B2 signal from the intersection value detected by the phase error detector,
 wherein the phase correction section generates an A correction signal and a B correction signal by multiplying the A2 signal and the B2 signal by the correction factor and corrects phase errors of the A phase and the B phase by adding the B correction signal to the A2 signal and adding the A correction signal to the B2 signal.

2. The phase correction circuit of an encoder signal of claim 1, wherein the phase error detector detects a value of the B2 signal at a point at which the phase error detector detects the peak value of the A1 signal, and detects a value of the A2 signal at a point at which the peak value of the B1 signal is detected.

3. The phase correction circuit of an encoder signal of claim 1, wherein the phase correction section obtains the correction factor computed based on the intersection value of the A2 signal and the B2 signal and a sign-inverted correction factor computed by the phase error detector based on a sign-inverted signal of the A2 signal or the B2 signal and an intersection value of the B2 signal or the A2 signal, and averages and uses the two correction factors.

4. The phase correction circuit of an encoder signal of claim 2, wherein the phase correction section computes the correction factor by detecting a value of the B2 signal or the A2 signal at a point at which the phase error detector detects a maximum value of the A2 signal or the B2 signal, computes an sign-inverted correction factor by detecting a value of the B2 signal or the A2 signal at a point at which a minimum value of the A2 signal or the B2 signal is detected, and averages and uses the computed correction factors.

5. The phase correction circuit of an encoder signal of claim 1, wherein the phase correction section computes the correction factor by detecting phase lead and lag from the intersection value of the A2 signal or the B2 signal and detecting a value of the B2 signal or the A2 signal at a point at which the phase error detector detects an intersection point with zero of the A2 signal or the B2 signal.

6. The phase correction circuit of an encoder signal of claim 2, wherein the phase correction section computes the correction factor by detecting phase lead and lag from a value of the B2 signal or the A2 signal at a point at which a maximum value or a minimum value of the A2 signal or the B2 signal is detected and detecting a value of the B2 signal or the A2 signal at a point at which the phase error detector detects an intersection point with zero of the A2 signal or the B2 signal.

7. The phase correction circuit of an encoder signal of claim 1, wherein an amplitude correction factor is computed from a phase error detected by the phase error detector and an amplitude of the sinusoidal signals of the A phase and the B phase corrected by the phase correction section is corrected.

8. The phase correction circuit of an encoder signal of claim 2, wherein an amplitude correction factor is computed from a phase error detected by the phase error detector and an amplitude of the sinusoidal signals of the A phase and the B phase corrected by the phase correction section is corrected.

9. The phase correction circuit of an encoder signal of claim 3, wherein an amplitude correction factor is computed from a phase error detected by the phase error detector and an amplitude of the sinusoidal signals of the A phase and the B phase corrected by the phase correction section is corrected.

10. The phase correction circuit of an encoder signal of claim 4, wherein an amplitude correction factor is computed from a phase error detected by the phase error detector and an amplitude of the sinusoidal signals of the A phase and the B phase corrected by the phase correction section is corrected.

11. The phase correction circuit of an encoder signal of claim 5, wherein an amplitude correction factor is computed from a phase error detected by the phase error detector and an amplitude of the sinusoidal signals of the A phase and the B phase corrected by the phase correction section is corrected.

12. The phase correction circuit of an encoder signal of claim 6, wherein an amplitude correction factor is computed from a phase error detected by the phase error detector and an amplitude of the sinusoidal signals of the A phase and the B phase corrected by the phase correction section is corrected.

13. The phase correction circuit of claim 1, wherein the phase correction section corrects the phase errors of the A phase and the B phase simultaneously.

\* \* \* \* \*